US 6,741,931 B1

(12) United States Patent
Kohut et al.

(10) Patent No.: US 6,741,931 B1
(45) Date of Patent: May 25, 2004

(54) VEHICLE NAVIGATION SYSTEM WITH OFF-BOARD SERVER

(75) Inventors: James K Kohut, Novi, MI (US); John R Robb, Grosse Pointe Woods, MI (US); Mahmoud A Al-Nsour, Troy, MI (US); Michael B Merrick, Fenton, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/235,107

(22) Filed: Sep. 5, 2002

(51) Int. Cl.[7] .......................... G06F 19/00; G01C 21/28
(52) U.S. Cl. .................... 701/209; 701/211; 701/213; 340/993; 342/357.06; 342/357.13
(58) Field of Search ................................ 701/207, 209, 701/211, 213; 348/143; 340/988, 991, 990, 993; 342/451, 357.01, 457, 357.06, 357.13

(56) References Cited

U.S. PATENT DOCUMENTS

| | | |
|---|---|---|
| 4,350,970 A | 9/1982 | von Tomkewitsch |
| 4,954,958 A | 9/1990 | Savage et al. |
| 5,223,844 A | 6/1993 | Mansell et al. |
| 5,285,060 A | 2/1994 | Larson et al. |
| 5,303,163 A | 4/1994 | Ebaugh et al. |
| 5,323,321 A | 6/1994 | Smith, Jr. |
| 5,365,449 A | 11/1994 | Kashiwazaki |
| 5,416,313 A | 5/1995 | Larson et al. |
| 5,416,478 A | 5/1995 | Morinaga |
| 5,537,324 A | 7/1996 | Nimura et al. |
| 5,774,827 A | 6/1998 | Smith, Jr. et al. ........... 701/209 |
| 5,790,973 A | 8/1998 | Blaker et al. |
| 5,802,492 A | 9/1998 | DeLorme et al. |
| 5,850,618 A | 12/1998 | Suetsugu et al. |
| 5,875,412 A | 2/1999 | Sulich et al. |
| 5,877,707 A | 3/1999 | Kowalick |
| 5,892,463 A | 4/1999 | Hikita et al. ................. 340/995 |
| 5,899,956 A | 5/1999 | Chan |
| 5,933,100 A | 8/1999 | Golding ....................... 340/995 |
| 5,948,040 A | 9/1999 | DeLorme et al. |
| 5,959,367 A | 9/1999 | O'Farrell et al. |
| 5,971,552 A | 10/1999 | O'Farrell et al. |
| 6,028,537 A | * 2/2000 | Suman et al. ............... 340/988 |
| 6,038,508 A | 3/2000 | Maekawa et al. |
| 6,087,953 A | 7/2000 | DeLine et al. |
| 6,116,743 A | 9/2000 | Hoek |
| 6,166,698 A | 12/2000 | Turnbull et al. ............ 343/713 |
| 6,169,902 B1 | 1/2001 | Kawamoto |
| 6,172,613 B1 | 1/2001 | DeLine et al. |
| 6,175,164 B1 | 1/2001 | O'Farrell et al. |
| 6,178,378 B1 | 1/2001 | Leibold ....................... 701/202 |
| 6,185,503 B1 | 2/2001 | Sumizawa |
| 6,222,460 B1 | 4/2001 | DeLine et al. |
| 6,239,925 B1 | 5/2001 | Ardrey et al. |
| 6,243,003 B1 | 6/2001 | DeLine et al. |

(List continued on next page.)

Primary Examiner—Thomas G. Black
Assistant Examiner—Ronnie Mancho
(74) Attorney, Agent, or Firm—Ralph E. Smith

(57) ABSTRACT

A vehicle navigation system communicates with a remote navigation server to download turn-by-turn command information via a mobile phone communication channel. After the mobile phone is disconnected from the remote server, an on-board transceiver module generates turn-by-turn command information to the vehicle operator in voice and/or visual form.

22 Claims, 4 Drawing Sheets

U.S. PATENT DOCUMENTS

| | | |
|---|---|---|
| 6,249,740 B1 | 6/2001 | Ito et al. |
| 6,256,580 B1 | 7/2001 | Meis et al. |
| 6,259,412 B1 | 7/2001 | Duroux |
| 6,278,377 B1 | 8/2001 | DeLine et al. |
| 6,297,781 B1 | 10/2001 | Turnbull et al. |
| 6,314,365 B1 | 11/2001 | Smith |
| 6,326,613 B1 | 12/2001 | Heslin et al. |
| 6,340,928 B1 * | 1/2002 | McCurdy .................. 340/436 |
| 6,351,708 B1 | 2/2002 | Takagi et al. |
| 6,366,213 B2 | 4/2002 | DeLine et al. |
| 6,386,742 B1 | 5/2002 | DeLine et al. |
| 6,396,446 B1 | 5/2002 | Walstra et al. ............. 343/713 |
| 6,405,106 B1 | 6/2002 | Sheth et al. .................... 701/1 |
| 6,407,468 B1 | 6/2002 | LeVesque et al. ......... 307/10.1 |
| 6,420,800 B1 | 7/2002 | LeVesque et al. ......... 307/10.1 |
| 6,427,120 B1 | 7/2002 | Garin et al. ................ 701/213 |
| 6,433,676 B2 | 8/2002 | DeLine et al. ........... 340/425.5 |
| 6,477,464 B2 | 11/2002 | McCarthy et al. |
| 6,487,494 B2 | 11/2002 | Odinak et al. |
| 6,542,812 B1 * | 4/2003 | Obradovich et al. ........ 701/207 |
| 6,553,308 B1 | 4/2003 | Uhlmann et al. |
| 6,622,083 B1 * | 9/2003 | Knockeart et al. .......... 701/202 |
| 2001/0041562 A1 | 11/2001 | Elsey et al. |
| 2002/0091486 A1 | 7/2002 | Hubschneider et al. |
| 2002/0152024 A1 | 11/2002 | Stefan |
| 2002/0165667 A1 | 11/2002 | Lee |
| 2002/0197955 A1 | 12/2002 | Witkowski et al. |
| 2003/0014187 A1 | 1/2003 | Chun et al. |
| 2003/0020603 A1 | 1/2003 | DeLine et al. |
| 2003/0033081 A1 | 2/2003 | Nassiff et al. |
| 2003/0050752 A1 | 3/2003 | Seto |
| 2003/0055555 A1 * | 3/2003 | Knockeart et al. .......... 701/202 |
| 2003/0071899 A1 * | 4/2003 | Joao ........................... 348/148 |

* cited by examiner

VEHICLE NAVIGATION SYSTEM WITH OFF-BOARD SERVER

BACKGROUND OF THE INVENTION

The invention generally relates to vehicular navigation systems for directing a vehicle operator to a specified destination. More specifically, the invention relates to a vehicle navigation system using a remote navigation server over a wireless telephone connection and downloading routing information to the vehicle via the wireless connection.

Traditional vehicle navigation systems utilize an on-board route calculator and map data base or, alternatively, utilize a remote navigation server connected on a real-time basis to the vehicle via a wireless (e.g. mobile or cellular phone) communication channel. Such systems also feature a dedicated full-screen display, typically associated with the vehicle's radio for visually giving the operator a route map to a desired destination. These known systems are complex and expensive and therefore are usually available as an option only in high-end luxury vehicles.

As vehicle navigation systems become more popular with the consumer base, a need arises for providing a more economical navigation system which may be incorporated into a broader range of vehicle categories.

SUMMARY OF THE INVENTION

Accordingly, we have discovered a relatively low-cost approach to providing a vehicle navigation system.

In one aspect of the invention, an on-board vehicular system for use with a remote navigation server including a navigation database, a route calculator and a voice message recognition and generation system, features an on-board vehicular system comprising a global positioning system receiver adapted to generate vehicular location coordinates in response to signals received from a global positioning system, a transceiver module for recognizing operator commands, for generating commands to the operator, and for sending, receiving and storing data messages, the transceiver module coupled to the global positioning system receiver for receipt of vehicle coordinate data, a mobile phone coupled by a wireless communication medium to the transceiver module and adapted to send vehicle coordinate data and route requests from the transceiver module to the remote navigation server and further adapted to receive navigational route information generated by the route calculator and to forward received information to the transceiver module by the wireless communication medium, and an instruction unit associated with the transceiver module for communicating to the operator turn-by-turn directional navigation instructions generated by the transceiver module in response to received navigational route information.

In another aspect of the invention, a method for assisting an operator in navigating a vehicle comprises the steps of activating a global positioning system receiver on board the vehicle to generate vehicle location coordinates, activating a transceiver module on board the vehicle and presenting an operator request for service thereto, wirelessly activating a mobile phone via the transceiver module and a wireless communications medium to establish a mobile phone communication channel between the transceiver module and a remote navigation server in response to the request, sending a vehicle destination identification via an operator routing message to the remote navigation server via the transceiver module, the wireless communication medium and the mobile phone communication channel, sending the vehicle location coordinates to the remote navigation server via the transceiver module, the wireless communication medium and the mobile phone communication channel, calculating, at the remote navigation server, turn-by-turn navigational command information and downloading the calculated information to the transceiver module via the mobile phone communication channel and the wireless communication medium, and generating turn-by-turn navigational instructions to the operator at the transceiver unit using the downloaded navigational command information.

BRIEF DESCRIPTION OF THE DRAWINGS

The objects and features of the invention will become apparent from a reading of a detailed description, taken in conjunction with the drawings, in which.

DETAILED DESCRIPTION OF THE PREFERRED EMBODIMENTS

Figure 1:
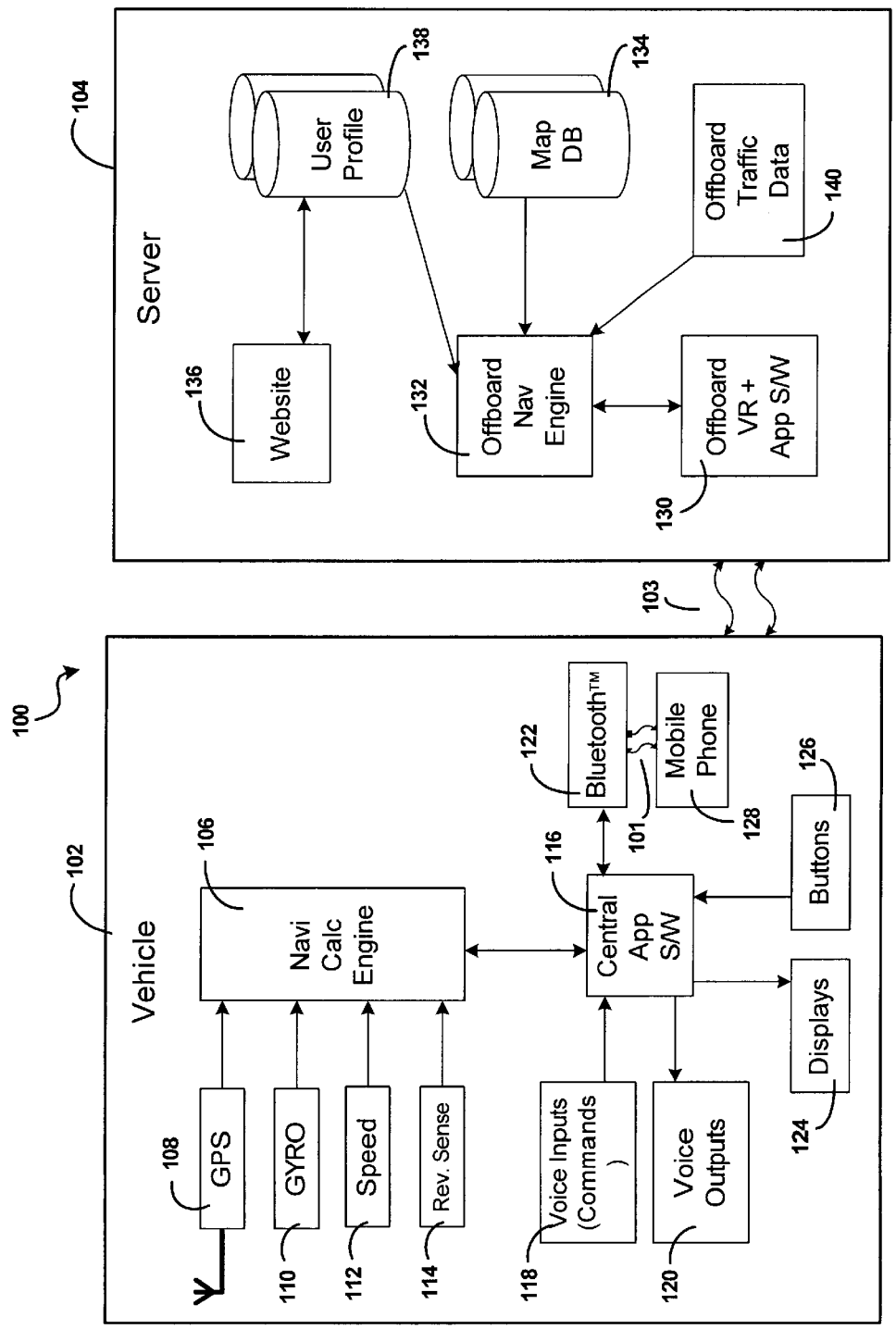
FIG. 1 is a functional block diagram of a vehicle navigation system arranged in accordance with the principles of the invention.

With reference to FIG. 1, navigation system 100 includes an on-board portion 102 and a remote portion 104.

On board portion 102 includes a navigational calculation microprocessor-based unit 106. Navigational calculator 106 is in communication with a global positioning system (GPS) via global positioning receiver 108. A dead reckoning gyroscope 110 can be optionally used in conjunction with the GPS system as is well understood in the art. Additionally, calculator 106 communicates with a speed sensor 112 and a reverse gear sensor 114 which receive their information from the vehicle's transmission system.

Calculator 106 additionally is coupled to central application software 116 which coordinates the calculator with specific hardware arrangements in the vehicle. Additionally associated with application software 116 are voice input command recognition unit 118, voice output command generator 120, displays 124 and button switches 126. While not to be construed as limiting, elements 106, 116, 118 and 120 are preferably grouped into a transceiver module (see element 204 of FIGS. 2A and 2B).

The transceiver module communicates with a mobile or cellular phone 128 carried in the vehicle, such communication preferably via a short range wireless communication medium 122 such as the Bluetooth™ technology, or alternative protocols such as one of 802.11a or 802.11b protocols. As will be discussed further below in conjunction with FIGS. 2A and 2B, other connections shown in the block diagram of FIG. 1 may be implemented via wireless technology as well.

In addition to the wireless communication path 101 established between the transceiver module and mobile phone 128, the mobile phone 128 communicates via a cellular communications channel 103 with a remote navigation server 104. Server 104 includes voice recognition, voice generation and general application software 130 which communicates with a navigational route calculator 132.

Route calculator 132 utilizes off-board traffic data 140, map information database 134 and user profile data 138 to generate navigational command information for transmission back to the vehicle via phone channel 103.

User profile data 138 may be generated by the vehicle operator by accessing website 136 via the Internet. Typical user profile data includes optional weather information requests, type of roads (e.g. main roads or highways only), and other navigational information preferences of a specific vehicle operator.

Bluetooth™ technology is a commercially available wireless communications medium in use, for example, by Nokia and Motorola. This technology is an open specification for wireless communication of data and voice. Bluetooth™ is based on a short-range radio link built into a microchip facilitating protected ad hoc connections for stationary and mobile communication environments. Designed to operate in a noisy radio frequency environment, Bluetooth™ technology uses a fast acknowledgment and frequency hopping scheme to effect the wireless communication link. Bluetooth™ communications operates in the unlicensed ISM band at 2.4 GHz.

Optionally, the transceiver module, principally elements 106, 118, 120 and 116 of FIG. 1, comprises a hands-free module with which the operator may communicate via voice commands. Alternatively, the operator may use input button switches 126 to provide command signals to the transceiver module and to the remote navigation server 104.

The vehicle operator activates the transceiver module elements via a button switch at 126 and then may, for example, initiate a navigational route request via a voice command. Because mobile phone 128 is Bluetooth™(or alternative wireless protocol) capable, phone 128 may be located at any place within the vehicle and does not require a dedicated docking port. Once the transceiver module is activated, the software program therein will initiate a mobile phone call to the remote server 104 via the wireless connection medium 122 and a phone channel 103. The operator then forwards, e.g. via voice command, a route request to the server 104, and server 104 then calculates turn-by-turn command information for reaching a specified destination. This command information is then downloaded to the transceiver unit on board the vehicle via the mobile phone link 103 and wireless medium 101, 122 and stored in a memory associated with navigation calculator microprocessor 106. Once the routing information has been downloaded, the mobile phone link may be dropped, and further operation of the system takes place on board the vehicle.

Microprocessor 106, in conjunction with information received from the GPS elements 108 and optional 110, along with speed and gear information 112 and 114, respectively, generates turn-by-turn commands to the operator. These commands may be either voice commands utilizing voice output software 120 or visual commands via display 124 or both. Preferably, the display is a simplified combined graphic and textual display device which may be located within a driver or occupant's line of sight, such as at the vehicle's radio or in the rearview mirror of the vehicle.

With the arrangement shown in FIG. 1, the complexity of system elements required on-board the vehicle is minimized by use of remote server 104, and the resultant navigational system is thereby rendered more economically viable for a wide range of vehicle classes.

Various on-board elements of the system set forth in FIG. 1 may be optionally grouped in a wide variety of ways. Four examples of such optional grouping are set forth in FIGS. 2A and B.

Figure 2A:
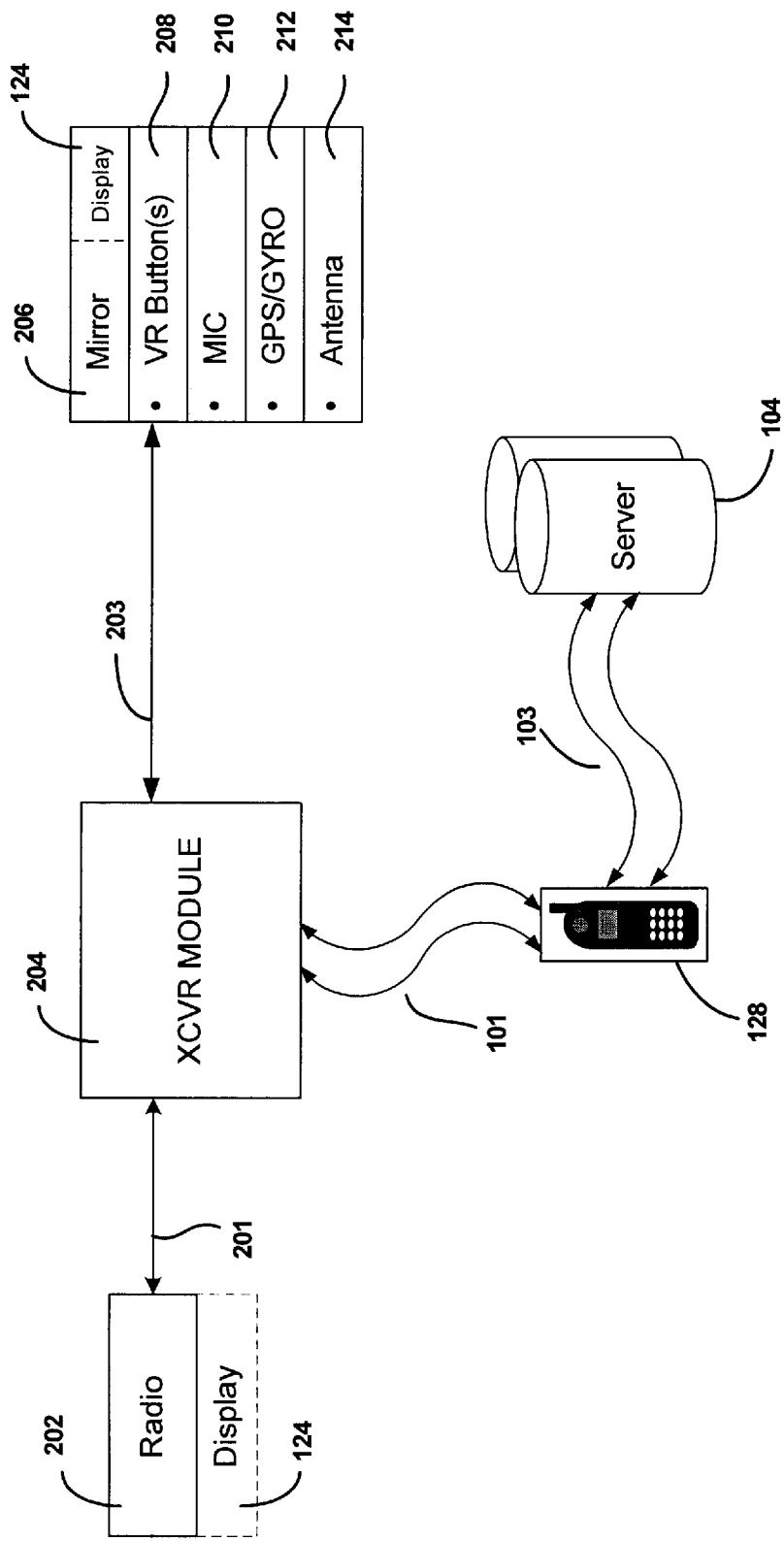
FIGS. 2A and B set forth various optional hardware grouping arrangements for a system arranged in accordance with the principles of the invention.

With reference to FIG. 2A, the operator display 124 of FIG. 1 is shown in dashed lines to denote that the display can be incorporated into or located with radio 202 and/or mirror 206. Display 124 can be arranged as a graphical display and/or a text display. Additionally, the speaker of radio 202 is utilized by the system to audibilize voice commands to the operator generated by the system.

Radio 202 is coupled such as via a vehicle communication bus 201 to transceiver module 204. Wireless medium connection 101, e.g. Bluetooth™ technology, couples transceiver 204 to mobile phone 128 for establishing mobile phone links 103 with remote navigation server 104.

Alternatively, the operator display may be incorporated into telematics mirror 206. Additionally associated with mirror 206 are voice recognition button switch 208, microphone 210 for receiving operator voice commands, GPS apparatus 212 and GPS antenna 214.

Communication between transceiver module 204 and the elements in mirror 206 may be either via hardwired bus, denoted as element 203 in FIG. 2A, or via a wireless medium such as the Bluetooth™ technology. Whether hardwired or wireless, switch information, analog voice information and serial data information is bidirectionally passed between transceiver module 204 and mirror 206.

Figure 2B:
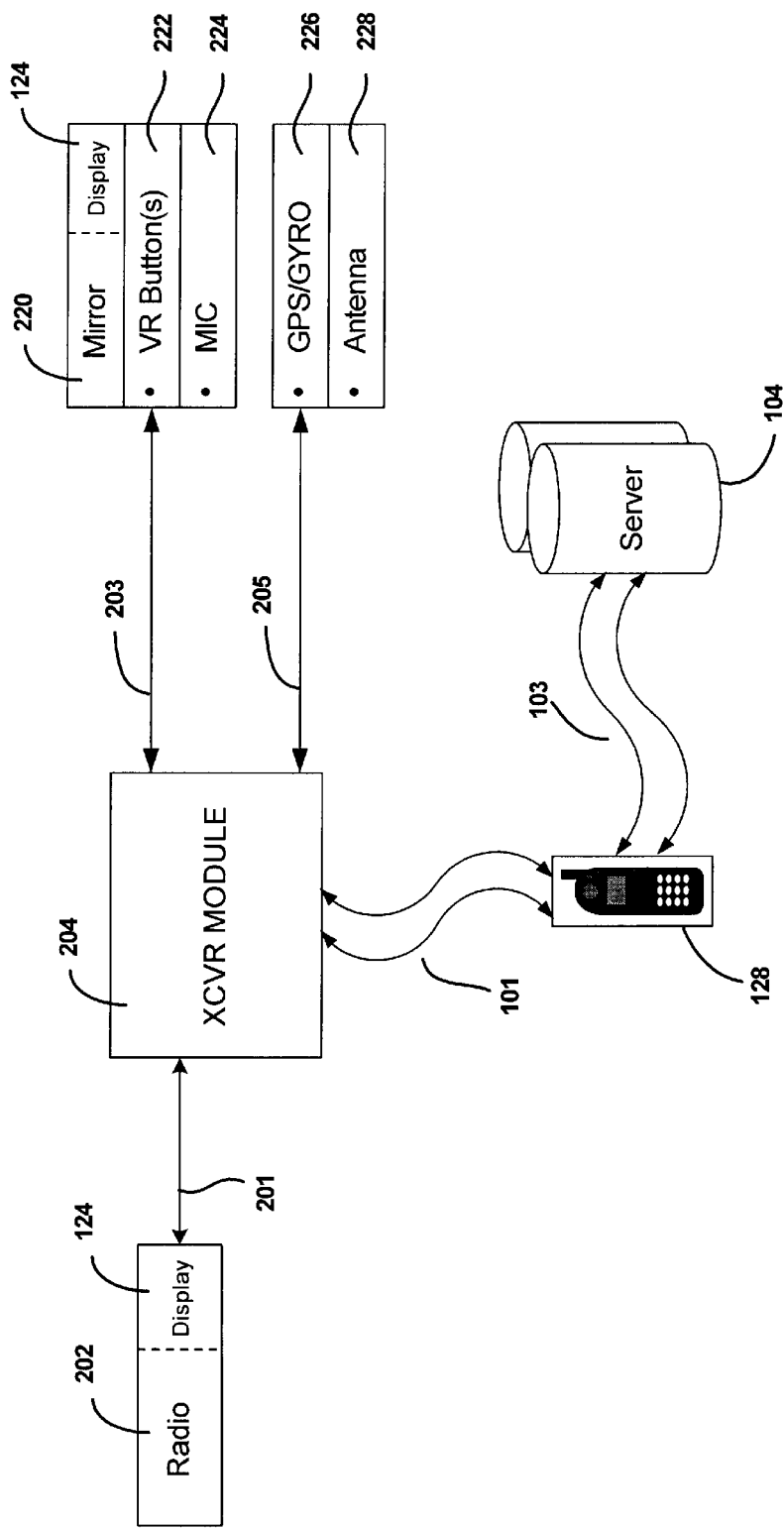

With reference to FIG. 2B, as with FIG. 2A, communication between transceiver module 204 and mirror 220 may be either hardwired or wireless. Mirror 220 carries button switches 222 for requesting voice recognition and microphone 224. In the optional arrangement of FIG. 2B, the GPS equipment 226 and GPS antenna 228 could be either mounted adjacent or behind the mirror 220 or in another remote location within the vehicle, and bidirectionally communicate with module 204 via a wire or wireless link 205.

The telematics mirror 206 preferably utilizes a transflective mirror to display a relatively small amount of information related to navigational commands to the operator. A transflective mirror has a reflective property as well as a transparency property. This allows for use of a small portion of the mirror surface to show information such as turn arrows, distance to the next turn, and street name of the road on which the vehicle is currently operating. When the display is not activated, the same mirror surface again becomes reflective. The display itself may, for example, comprise a liquid crystal or a vacuum fluorescent type device. When the display is activated, graphical and textual information formed on the display may be passed through the mirror and made visible to the vehicle operator. When disabled, the display cannot be seen and the mirror appears as a one piece surface allowing full use of the mirror.

The graphical portion of the display may comprise a dot matrix liquid crystal or vacuum fluorescent device for displaying turn arrows, etc. Textual information may be displayed utilizing a row oriented dot matrix liquid crystal or vacuum fluorescent display device.

Figure 3:
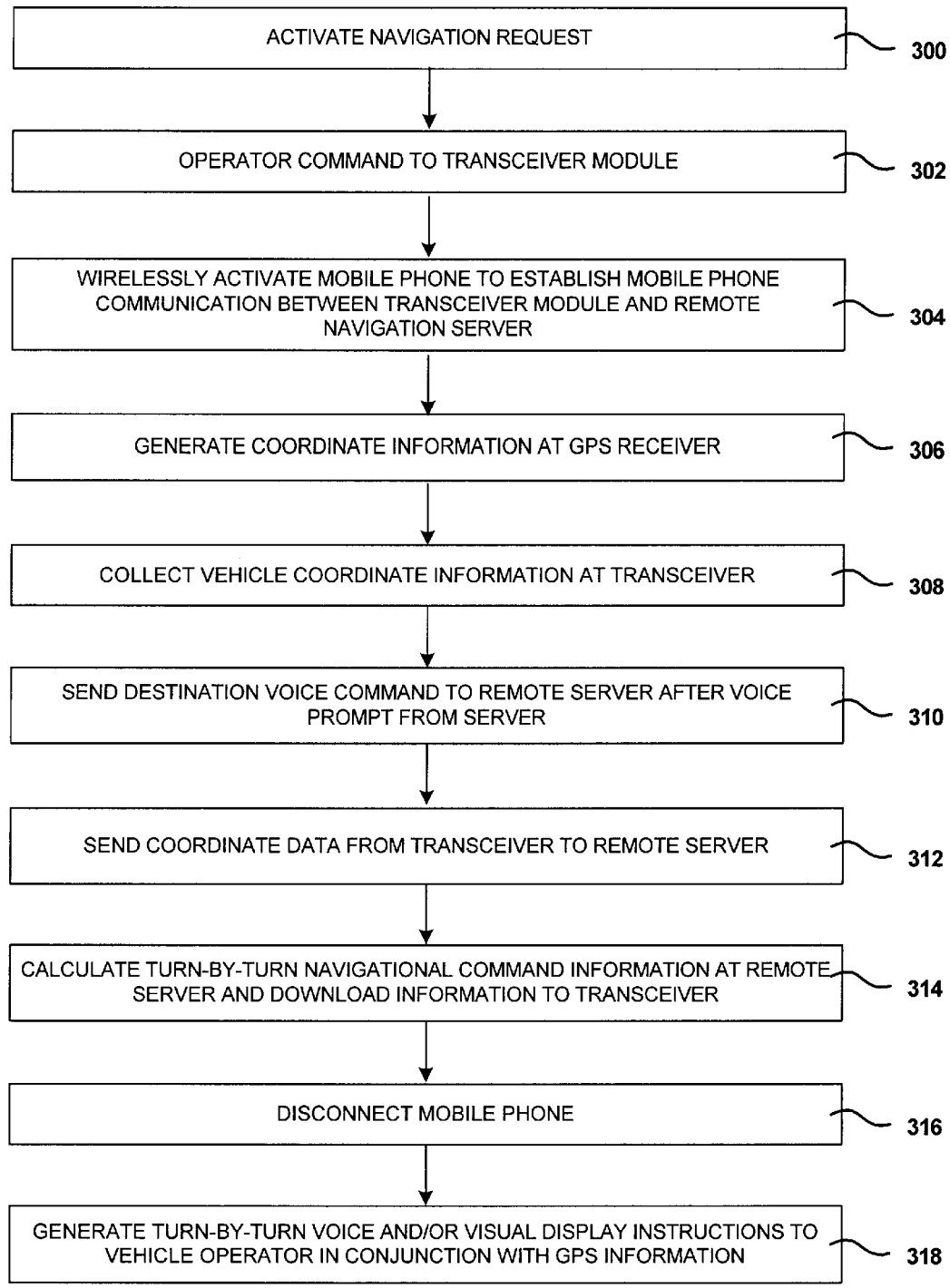
FIG. 3 is a flow chart setting forth a sequence of basic functional steps in accordance with the principles of the invention.

An exemplary basic operation of the navigational system of the invention can best be explained in conjunction with the flowchart of FIG. 3.

At step 300, the vehicle operator initiates or activates a navigation request by depressing an appropriate button 126, positioned, for example, on the vehicle's rearview mirror.

At step 302, the operator passes a command to the transceiver module 204 either via voice or via switch activation.

At step 304, the transceiver module wirelessly activates mobile phone 128 to establish a mobile phone communication 103 between the transceiver module and a remote navigation server 104.

At step 306, the vehicle coordinate information is generated at GPS receiver 108.

At step 308, the coordinate information is gathered and arranged for appropriate subsequent transmission to remote server 104.

At step 310, the operator receives a voice prompt from server 104 and then, via voice or switch signal command, sends a destination request to remote server 104 via wireless Bluetooth™ connection 101 and mobile phone channel 103.

At step 312, transceiver module 204 forwards the coordinate data from the transceiver module to the remote server 104.

At step 314, navigational command information is calculated on a turn-by-turn basis at remote server 104 and this navigational command information is then downloaded to transceiver unit 204 via the mobile channel 103 and the Bluetooth™ channel 101.

At step 316, mobile phone 128 is disconnected from the remote server, and at step 318 turn-by-turn voice and/or visual display instructions are generated for the benefit of the vehicle operator. These instructions also rely on constantly updated global positioning system vehicle coordinate information along with speed and gear sensing information obtained from the vehicle bus. In accordance with another aspect of the present invention, the visual display can be modified so that graphics or icons, such as a turn arrow, can change in size on the display as the next maneuver on the route is approached. By way of example, as a turn is approached, when the vehicle reaches a first predetermined distance from the turn (for example 100 m), the graphic turn indicator can be reduced in size from its normal or default size. Then as the vehicle reaches a second predetermined distance from the turn, such as 50 m, the graphic turn indicator can again be reduced in size on the display.

It is to be noted that those steps described above relating to the transmission of voice commands could alternatively be effected via switch signals.

Server 104 may optionally alter its route calculations based on real time traffic data collected in database 140 of FIG. 1. Additionally, server 104 can customize the routing information based on user profile information stored in database 138 of FIG. 1.

As an additional option, remote server 104 can be arranged to recognize accident or other traffic situations along a previously calculated route, automatically establish its own mobile phone connection 103 with the vehicle, and generate a voice inquiry as to whether the vehicle operator would like to alter the route due to the updated traffic information. In such an arrangement, the remote server would be arranged, such as through suitable programming, to track such accident or other traffic conditions on a route already sent to a user. With such tracking, the remote server can use the traffic event as a trigger for determining if a user had been recently sent route information in proximity to such traffic event, and for such users, determining based on distance and time relative to the user whether the vehicle is likely still approaching the traffic event. If so, then the remote server can automatically initiate the call to the vehicle operator alerting of the traffic event and inquiring whether updated routing is desired. When using cellular or mobile phone 128 in the navigation system, cellular calls are initiated originally as a data call for appropriate handshaking with server 104. Subsequently, the call is switched to a voice mode for optional transmission of voice commands between server 104 and the vehicle 102. Then, the next phase could revert to a data mode for downloading of the routing information from the server 104 to the transceiver module 204 on board vehicle 102. Alternatively, many cellular phones are now capable of simultaneous voice and data transmission, thereby obviating the necessity for switching between data and voice modes once the cellular communication channel is established.

It will become apparent to those skilled in the art that use of the arrangement described herein as an example of the invention will result in a relatively low cost navigation system for vehicles. It will likewise be apparent to those skilled in the art that many alternatives to these specific examples described herein are possible while still falling within the scope and spirit of the invention.

We claim:

1. An on-board vehicular system for use with a remote navigation server including a navigation data base, a route calculator and a voice message recognition and generation system, the on-board vehicular system comprising:

a global positioning system (GPS) receiver adapted to generate vehicular location coordinates in response to signals received from a GPS;

a transceiver module for recognizing operator commands, for generating commands to the operator and for sending, receiving and storing data messages, the transceiver module coupled to the GPS receiver for receipt of vehicle coordinate data;

a mobile phone coupled via a wireless communication medium to the transceiver module and adapted to send vehicle coordinate data and route requests from the transceiver module to the remote navigation server and further adapted to receive navigational route information generated by the route calculator and to forward received information to the transceiver module via the wireless communication medium; and an instruction unit associated with the transceiver module for communicating to the operator turn-by-turn directional navigation instructions generated by the transceiver module in response to received navigational route information.

2. The system of claim 1 wherein the instruction unit further comprises a display for visually communicating the turn-by-turn commands to the operator.

3. The system of claim 2 wherein the display is incorporated into a rear-view mirror of the vehicle.

4. The system of claim 2 wherein the display is incorporated into a radio of the vehicle.

5. The system of claim 1 wherein the instruction unit further comprises a speaker for communicating via voice commands the turn-by-turn commands to the operator.

6. The system of claim 5 wherein the speaker comprises a radio speaker of the vehicle.

7. The system of claim 1 wherein the transceiver module is connected to a microphone and arranged to recognize voice commands from the vehicle operator.

8. The system of claim 1 wherein the wireless communication medium utilizes Bluetooth™ communication protocol.

9. The system of claim 1 wherein the transceiver module is further operative to deactivate the mobile phone after downloading the navigational route information.

10. The system of claim 9 wherein the mobile phone is further operative to subsequently receive communications initiated by the remote navigation server after deactivation of the mobile phone by the transceiver module and to relay the communications to the transceiver unit via the wireless communication medium.

11. A method for assisting an operator in navigating a vehicle, the method comprising the steps of:

activating a global positioning system receiver on board the vehicle to generate vehicle location coordinates;

activating a transceiver module on board the vehicle and presenting an operator request for service thereto;

wirelessly activating a mobile phone via the transceiver module and a wireless communications medium to establish a mobile phone communication channel between the transceiver module and a remote navigation server in response to the voice request;

sending a vehicle destination identification via an operator routing message to the remote navigation server via the transceiver module, the wireless communication medium and the mobile phone communication channel;

sending the vehicle location coordinates to the remote navigation server via the transceiver module, the wireless communication medium and the mobile phone communication channel;

calculating, at the remote navigation server, turn-by-turn navigational command information and downloading the calculated information to the transceiver module via the mobile phone communication channel and the wireless communication medium; and generating turn-by-turn navigational instructions to the operator at the transceiver unit using the downloaded navigational command information.

12. The method of claim 11 comprising the further step of:

deactivating, after the step of calculating and downloading, the mobile phone communication channel in response to a signal from the transceiver unit.

13. The method of claim 12 comprising the further step of:

initiating at the remote navigation server a subsequent communication channel to the mobile phone after the step of deactivating.

14. The method of claim 13 wherein the step of initiating occurs at any time during the step of generating.

15. The method of claim 14 comprising the further steps of:

downloading updated turn-by-turn navigational command information from the remote navigation server to the transceiver unit; and generating updated turn-by-turn navigational instructions to the operator at the transceiver unit using the downloaded updated navigational command information.

16. The method of claim 11 comprising the further step of:

visually displaying the turn-by-turn navigational instructions to the operator.

17. The method of claim 16 wherein the displaying occurs at a rear view mirror of the vehicle.

18. The method of claim 11 comprising the further step of:

audibly informing the operator of the turn-by-turn navigational instructions via a speaker associated with the transceiver unit.

19. The method of claim 11 wherein the step of activating the transceiver module includes presenting an operator voice request for service thereto.

20. The method of claim 16 wherein the displaying occurs at a radio of the vehicle.

21. The method of claim 17 wherein the speaker is associated with a radio of the vehicle.

22. The method of claim 11 wherein the step of sending a vehicle destination identification is effected via an operator voice command.

* * * * *